US011975501B2

(12) United States Patent
Frings et al.

(10) Patent No.: US 11,975,501 B2
(45) Date of Patent: May 7, 2024

(54) PRESS PAD AND METHOD FOR PRODUCING THE SAME

(71) Applicant: HUECK Rheinische GmbH, Viersen (DE)

(72) Inventors: Wolfgang Frings, Viersen (DE); Berthold Thoelen, Viersen (DE)

(73) Assignee: HUECK Rheinische GmbH, Viersen (DE)

(*) Notice: Subject to any disclaimer, the term of this patent is extended or adjusted under 35 U.S.C. 154(b) by 295 days.

(21) Appl. No.: 17/221,803

(22) Filed: Apr. 4, 2021

(65) Prior Publication Data

US 2021/0229389 A1 Jul. 29, 2021

Related U.S. Application Data

(63) Continuation of application No. PCT/EP2019/083006, filed on Nov. 29, 2019.

(30) Foreign Application Priority Data

Dec. 21, 2018 (DE) ......................... 102018133542.3

(51) Int. Cl.

*D03D 15/00* (2021.01)
*B27N 3/20* (2006.01)
*B30B 15/06* (2006.01)
*D03D 15/25* (2021.01)

(Continued)

(52) U.S. Cl.

CPC ............ *B30B 15/061* (2013.01); *B27N 3/203* (2013.01); *D03D 15/25* (2021.01); *D03D 15/43* (2021.01); *D10B 2101/20* (2013.01); *D10B 2331/021* (2013.01); *D10B 2505/00* (2013.01)

(58) Field of Classification Search

CPC ........ B30B 15/061; B27N 3/203; B27N 7/00; D03D 15/25; D03D 15/43; D03D 1/00; D10B 2101/20; D10B 2331/021; D10B 2505/00

See application file for complete search history.

(56) References Cited

U.S. PATENT DOCUMENTS

| | | | | |
|---|---|---|---|---|
| 8,261,803 | B2 * | 9/2012 | Espe | B30B 5/02 156/583.1 |
| 8,573,280 | B2 * | 11/2013 | Marxen | B30B 15/064 156/581 |
| 10,245,880 | B2 * | 4/2019 | Stoffel | B44B 5/026 |

(Continued)

FOREIGN PATENT DOCUMENTS

| | | |
|---|---|---|
| DE | 1957918 U | 3/1967 |
| DE | 202007006767 U1 | 7/2007 |

(Continued)

*Primary Examiner* — Robert H Muromoto, Jr.
(74) *Attorney, Agent, or Firm* — Von Rohrscheidt Patents

(57) ABSTRACT

A press pad for a hydraulic heating press arrangement, the press pad including a fabric, wherein the fabric is formed by warp threads in a warp direction and weft threads in a weft direction, wherein the warp threads and the weft threads are woven together to form the fabric, and wherein functional threads run in the warp direction or in the weft direction and are connected with the fabric so that a thickness of the fabric in an effective portion of the functional threads differs from a thickness of the fabric outside of the effective portion of the functional threads.

16 Claims, 7 Drawing Sheets

(51) Int. Cl.
*D03D 15/43* (2021.01)
*D03D 1/00* (2006.01)

(56) References Cited

U.S. PATENT DOCUMENTS

| | | | | | |
|---|---|---|---|---|---|
| 10,773,481 | B2 * | 9/2020 | Espe | ..................... | B30B 15/064 |
| 2018/0236740 | A1 * | 8/2018 | Espe | ..................... | B30B 15/064 |
| 2020/0171771 | A1 * | 6/2020 | Espe | ...................... | D06M 11/09 |

FOREIGN PATENT DOCUMENTS

| | | | | | | |
|---|---|---|---|---|---|---|
| GB | 1212591 | A | * | 11/1970 | ............... | B27N 3/20 |
| WO | WO2004054788 | A1 | | 7/2004 | | |

* cited by examiner

PRESS PAD AND METHOD FOR PRODUCING THE SAME

RELATED APPLICATIONS

This application is a continuation of International application PCT/EP2019/083006 filed on Nov. 29, 2019 claiming priority from German patent application DE 10 2018 133 542.3 filed on Dec. 21, 2018, both of which are incorporated in their entirety by this reference.

FIELD OF THE INVENTION

The invention relates to a press pad and to a method for producing the press pad.

The press pad is suited in particular for an application in a hydraulic heating press arrangement. The heating press arrangement can be configured in particular as a hydraulic multi-level heating press. The press pad includes a fabric that is formed by warp threads extending in a warp direction and weft threads that extend in a weft direction. The warp threads and the weft threads are woven together into the fabric.

BACKGROUND OF THE INVENTION

Press pads of the type recited supra are configured to provide an even force distribution between a hydraulically operated heating press and a press plate in a heating press arrangement wherein the press plate comes into direct contact with a respective press blank. The press plate typically includes a structured surface that includes a press relief. The press relief is pressed into a surface of the respective press blank during a pressing process so that a negative of a structure of the press relief is produced in the surface of the press blank. The press blank is soft at least in a portion of its surface during the pressing process, wherein the press blank typically includes a melamine resin layer. This soft consistency facilitates pressing the press relief of the press plate into the press blank wherein the soft material of the press blank gives and is compressed locally.

Thermal energy introduced by the heating press into the press blank cures the press blank so that the impressed surface structure that corresponds to a negative of the structure of the press relief is maintained permanently. In order to configure the surface of the press blank evenly and thus in an optically appealing manner it is important that compressing pressure generated by the heating press is uniformly transferred to the press plate and eventually uniformly transferred to the press blank. As stated supra the press pad is configured to evenly transfer the pressing pressure from the heating pad to the press plate.

Fabrication quality of engineered surface structures of press blanks that replicate in particular natural wood grains and wood surface structures has significantly improved in recent years. This is caused in particular by the fact that embossing depths that are introduced into the press blanks have increased so that the replication of natural surface structures has substantially improved.

Introducing deep surface structures that are provided with high embossing depths requires using press plates whose press reliefs include high portions whose height measured perpendicular to a press plate plane corresponds to a desired depth of the respective local surface structure of the press blank. Thus, it is appreciated that introducing a particularly deep local surface structure of the respective press blank requires a particularly high portion of the press relief of the press plate. Impressing a press plate of this type that includes a press relief that is provided with these high portions into the respective press blank causes a resistance that impacts the press plate in a form of a reaction force to greatly differ over the surface of the press plate. Thus, impressing a high portion into the surface of the press blank requires a greater force than impressing a structure of the press relief that protrudes very little beyond the press plate plane. In practical applications this means that the force that is required to impress the high portion of the press relief into the press blank cannot be transferred to the press plate reliably.

BRIEF SUMMARY OF THE INVENTION

Thus, it is an object of the invention to provide a press pad that is improved over prior art press pads.

The object is achieved by a press pad for a hydraulic heating press arrangement, the press pad including a fabric, wherein the fabric is formed by warp threads in a warp direction and weft threads in a weft direction, wherein the warp threads and the weft threads are woven together to form the fabric, and wherein functional threads run in the warp direction or in the weft direction and are connected with the fabric so that a thickness of the fabric in an effective portion of the functional threads differs from a thickness of the fabric outside of the effective portion of the functional threads.

Advantageous embodiments can be derived from the dependent claims.

The press pad according to the invention is characterized in that functional threads are connected with the remainder of the fabric in the warp direction and/or in the weft direction of the fabric so that a thickness of the fabric is changed in an effective portion of the functional threads compared to a thickness of the fabric outside of the effective portion. The functional treads can be additional threads which are introduced into the fabric or are applied to the fabric during or after production of the fabric. Alternatively or additionally, it is also conceivable that functional threads are woven into the fabric by replacing some of the warp threads and/or weft threads. Thus, a thickness of the fabric in non-deformed condition of the fabric, thus in a force free condition where no pressure is applied upon the fabric is changed in an effective portion of the functional threads compared to a thickness outside of the effective portion.

Advantageously the new press pad according to the invention is configured so that at least a portion of the functional threads, advantageously all functional threads are configured as thickening threads. The thickening threads increase the thickness of the fabric in the portion of the thickening threads compared to the thickness of the fabric outside of the effective portion of the thickening threads.

The press pad according to the invention has many advantages. In particular the functional threads are configured to individually adapt to the thickness of the fabric to a respective press plate that is configured with a particular press relief. Thus, at least a portion of the press plate whose press relief includes a particularly pronounced high portion can be matched by a portion of the press pad that corresponds to the high portion of the press plate and includes at least one functional thread that increases the thickness of the fabric of the press pad. This increase of the thickness of the fabric has the technical effect that the press pad is less compressible in the effective portion of the functional thread that corresponds to the high portion of the press relief under a reaction force that is generated in the press blank due to the increased resistance when impressing the press plate compared to a condition without the functional threads. This way it is assured that the structure of the press relief that includes the high portion is reliably and completely impressed into the press blank to achieve the intended surface structure of the press blank. An escapement of the press plate relative to the press blank is blocked to a large extent compared to the desired giving of the material of the press blank relative to the press plate.

Depending on a design of the surface structure of the press blank that is predetermined and formed corresponding to the structure of the press relief of the press plate functional threads can be used in the warp direction as well as in the weft direction of the fabric. Advantageously functional threads are used in order to locally increase the thickness of the fabric. By the same token, it is also conceivable to provide functional threads that cause a reduction of the thickness of the fabric. For example, it is also conceivable to replace individual weft threads with functional threads whose diameter is reduced over a diameter of the typical weft threads. This has a direct effect upon the thickness of the fabric that is reduced in the effective portion of the functional threads.

Advantageously at least a portion of the functional threads can be sewed or woven onto the finished fabric or sewn into the finished fabric. Alternatively, or additionally, it is also conceivable that at least a portion of the functional threads is woven into the fabric, wherein a respective functional thread is advantageously introduced already during production of the fabric of the press pad. Alternative connection techniques are also conceivable that bring at least a portion of the functional threads into an operating connection within the remaining fabric of the press pad.

Advantageously at least a major portion, more advantageously all warp threads are made from metal, Brass is particularly suitable because it has high heat conductivity. This facilitates transferring thermal energy that is provided by the heating press through the press pad to the press plate. The press plate is thus heated during the pressing so that at least a surface layer of the press blank can be hardened. This applies in particular for a surface layer of the press blank that is formed by melamine resin and that hardens due to the heat introduction.

In particular when the warp threads of the fabric are formed by metal threads that have high heat conductivity it can be advantageous when the functional threads that are connected with the rest of the fabric are formed by an aramid, in particular a para aramid. Functional threads of this type have many advantages. On the one hand side they are temperature resistant so that typical temperature levels that prevail during pressing do not impair an effectivity of the function of the threads. Furthermore the functional threads have a lower thermal expansion coefficient so that a length change of the functional threads formed by an aramid during typical temperature variations that occur during operations of a heating press are minimal. Furthermore, aramids, in particular para aramid are fire resistant.

Another essential technical advantage is that aramids have low heat conductivity. This has the technical effect that thermal energy provided by the heating press is not transferred to the press plate in the same manner as in a situation where the functional threads are not provided, Put differently introducing aramid functional threads retards the heat transfer between the heating press and the press plate. This has the particular advantage that the material of the surface layer of the press blank cures less quickly in an effective area of the respective functional threads and thus more time is available during which the material can escape from the high portion of the structure of the press relief of the press plate, By comparison a particularly quickly curing of the press blank renders introducing a particularly deep surface structure more difficult since the viscosity of the material of the press blank would rise particularly quickly in a portion of its surface layer during the pressing process which in turn makes impressing the respective high portion of the press relief into the surface layer more difficult.

Independently from the materials that form the warp threads and/or the functional threads that run in the warp direction of the fabric it can be particularly advantageous when at least a majority of the functional threads that are arranged in the warp direction, advantageously all functional threads arranged in the warp direction have a diameter between 0.1 mm and 0.3 mm, advantageously between 0.5 mm and 0.25 mm. Functional threads of this type are particularly well suited to increase a thickness of the fabric in an effective portion of the functional threads by an amount that causes the desired technical effects, this means, in particular, more uniform force transmission from the heating press onto the press plate.

In another advantageous embodiment of the press plate according to the invention at least a majority of the weft threads, advantageously all weft threads are formed by an elastomeric material, in particular silicone. Weft threads of this type are particularly well suited to provide the required elasticity of the press pad wherein low heat conductivity of the elastomeric material prevents excessively fast transmission of thermal energy from the heating press onto the press plate, Advantageously a diameter of a respective weft thread is between 1.50 mm and 1.60 mm. Advantageously at least a portion of the functional threads that run in the weft direction is formed by silicone.

In a particularly advantageous embodiment of the press pad according to the invention a plurality of the functional threads is formed by thickening warp threads in the warp direction of the fabric. The thickening warp threads facilitate an increase of a thickness of the fabric in the effective portion of the functional threads compared to the thickness of the fabric outside of the effective portion. The thickening warp threads are advantageously sewn or woven onto the fabric in the warp direction. These are additional threads so that a total number of all warp threads is increased due to the introduction of the thickening warp threads compared to a fabric of a press pad that does not include any of the thickening warp threads in the warp direction.

It can be furthermore advantageous when a plurality of the functional threads in the weft direction is formed by thickening weft threads. The thickening weft threads cause the thickness of the fabric in an effective portion of the thickening weft threads to be greater than outside of the effective portion. The thickening weft threads are advantageously woven into the fabric. The thickening weft threads can be advantageously configured so that a diameter of a respective thickening weft thread is increased over a diameter of the normal weft thread. In particular a diameter of the thickening weft threads can be at least 1.65 mm advantageously at least 1.7 mm.

Weaving a respective thickening weft thread into the fabric is advantageously performed in that a regular weft thread is left out and replaced by a thickening weft thread. Put differently the fabric is woven by performing a respective weft with a thickening weft thread instead of a normal weft thread. Since the diameter of the thickening weft thread is increased over the diameter of a normal weft thread this replacement of the normal weft thread with the thickening weft thread causes the intended increase of the thickness of the fabric in the effective portion of the thickening weft thread. In this configuration a total number of weft threads remains constant during the weaving of the thickening weft threads into the fabric compared to a fabric that does not include the thickening weft threads.

In a particularly advantageous embodiment of the press pad according to the invention the functional threads are unevenly distributed in the fabric. This is advantageous in that a non-uniform structure of a press relief can be replicated by the uneven distribution of the functional threads so that the functional threads become effective exactly in portions of the press pad where their effect is intended and required in view of the configuration of the press relief of the press plate. It is particularly advantageous to adapt a respective press pad according to the invention individually according to the design of a respective press plate or to a respective surface structure of a press blank, The object is furthermore achieved by a method for producing a press pad for a hydraulic heating press arrangement, the method including predetermining a design of a press plate that is configured to impress a press blank in the hydraulic heating press arrangement wherein the press plate includes a press relief that includes a structure, so that a surface structure is producible in the press blank that corresponds to the press relief by impressing the press plate into a surface layer of the press blank; producing the press pad adapted to dimensions of the press plate, wherein warp threads and weft threads are woven into a fabric of the press pad, wherein the press pad is produced as a function of a predetermined design of the press plate so that a thickness of the fabric is adapted at least in portions of the press pad that correspond to high portions of the press relief, wherein functional threads are connected with the fabric so that the thickness of the fabric in effective portions of the functional threads differs from the thickness of the fabric outside of the effective portions of the functional threads.

The method according to the invention is characterized in that the press pad is produced as a function of the predetermined design of the press plate. Thus, the press pad is produced so that its fabric is thickness adjusted in a plurality of portions in the press pad that corresponds to high portions of the press relief. This can include a local thickening or a local thinning of the fabric wherein a combined configuration is also conceivable where the fabric is thickened in a first portion and thinned in a second portion. In order to adjust the thickness of the fabric functional threads are connected according to the invention with the remainder of the fabric so that the thickness of the fabric differs in an effective portion of the functional threads compared to a thickness of the fabric outside of the effective portion. The functional threads can be additional threads that are not included in a fabric without functional threads. By the same token, functional threads can be replacement threads that replace otherwise provided threads of the fabric so that a total number of threads of the fabric remains unchanged. Both techniques can be combined in one fabric.

The method according to the invention has many advantages. In particular the method facilitates producing a press pad that assures reliable force transmission to the respective press plate during a pressing cycle. Since the press pad is individually adapted to a configuration of the press plate or the structure of the associated press relief. Thus, the press pad includes at least one functional thread at locations where the press relief of the press plate has a corresponding structure wherein the functional thread makes the press pad combinable according to technical requirements with the configuration of the press relief. This way the fabric of the press pad can be configured thickened in particular in high portions of the structure of the press relief so that reaction forces that become effective at these locations or in these portions of the press plate can be applied reliably during the pressing cycle. As a result the press plate is pressed into the press blank with an entirety of the high portion of the press plate so that the desired surface structure is established in the press blank.

In a particularly advantageous embodiment of the method according to the invention where a press plate-press pad unit is produced the press pad and the press plate are connected with one another in a force transferring manner so that relative movements between effective portions of the functional threads of the press pad and corresponding portions of the press relief of the press plate are at least substantially prevented, advantageously completely prevented. The force transmitting connection is advantageously effective in at least one plane that is oriented parallel to the press plate plane. The connection can be provided e.g. by gluing. The force transmitting connection of press plate and press pad has the particular advantage that the individually configured positions of the press pad that are adapted to the press plate permanently cooperate with corresponding portions of the press plate in any case, this means also after a plurality of pressing cycles. This way the technical effect provided by the functional threads is permanently provided at the correct location of the associated press plate.

BRIEF DESCRIPTION OF THE DRAWINGS

The invention is subsequently described based on an embodiment with reference to drawing figures, wherein.

DETAILED DESCRIPTION OF THE INVENTION

Figure 1:
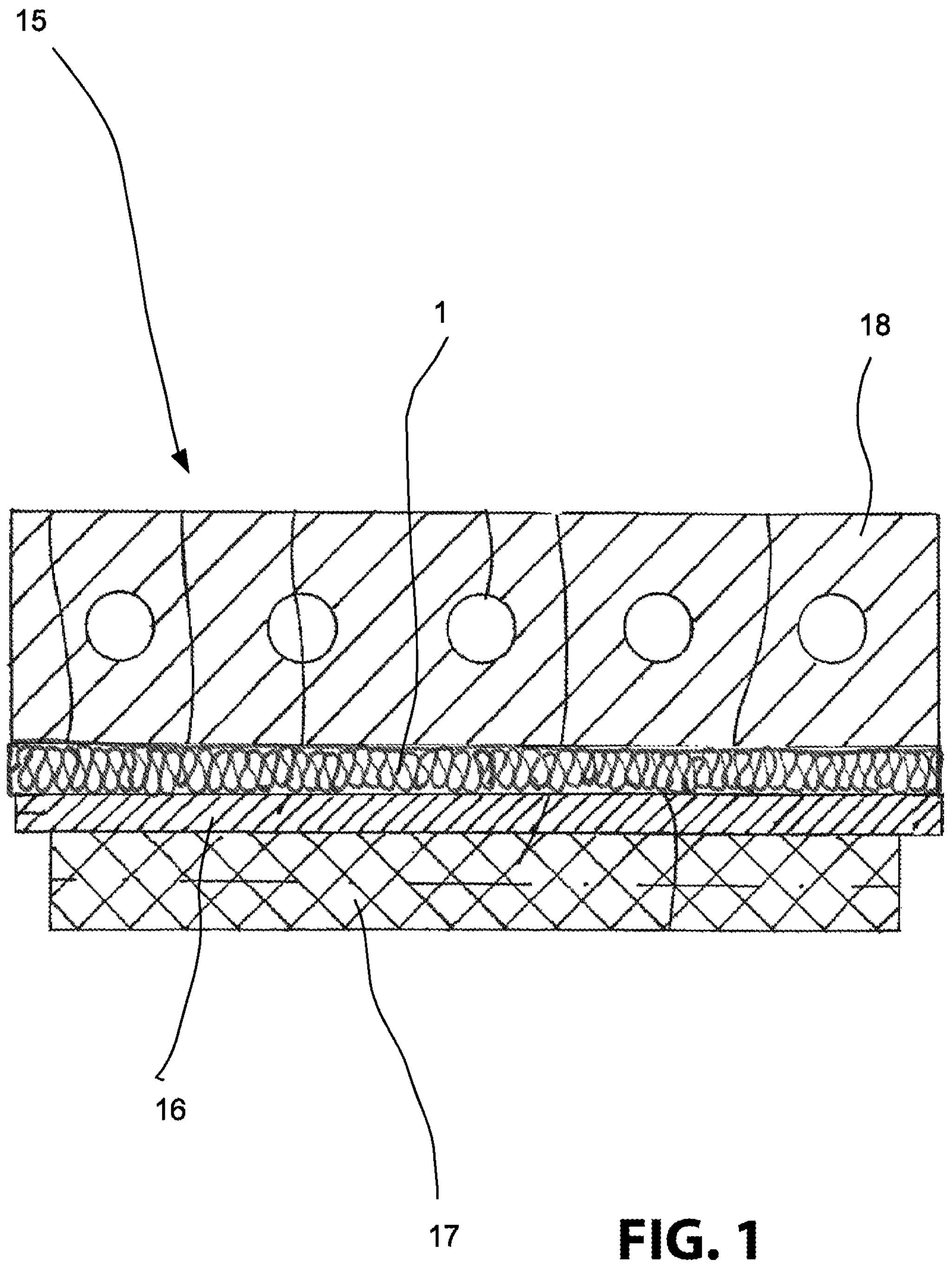
FIG. 1 illustrates a cross-sectional view of a heating press arrangement that is configured with a press pad according to the invention.

An embodiment that is illustrated in FIGS. 1-7 relates to a press pad 1 according to the invention that is installed in a heating press arrangement. The press pad 1 that is formed by a fabric 2 is being used in combination with an associated press plate 16 for processing a press blank 17. The press pad 1 is arranged between a heating press 18 of the heating press arrangement 15 and the press plate 16, so that a force transmission is provided between the heating press 18 and the press plate 16 using the press pad 1. The press pad 1 is used for making forces between the heating press 18 and the press plate 16 more uniform so that the press plate 16 is evenly loaded by a pressure force over an entire surface of the press plate wherein the pressing force is provided by the heating press 18.

Figure 2:
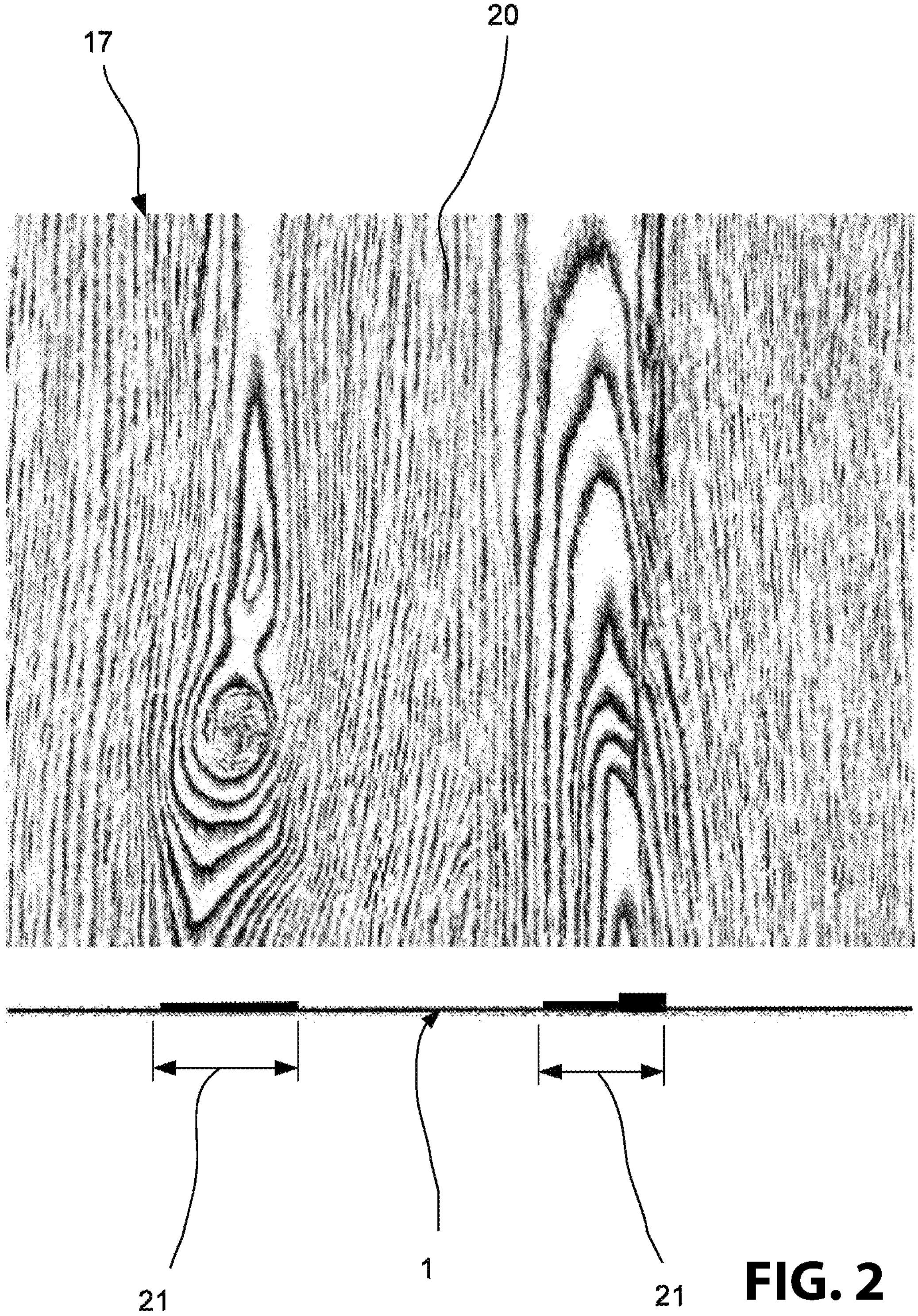
FIG. 2 illustrates a top view of a design of a surface structure of a press blank.
Figure 3:
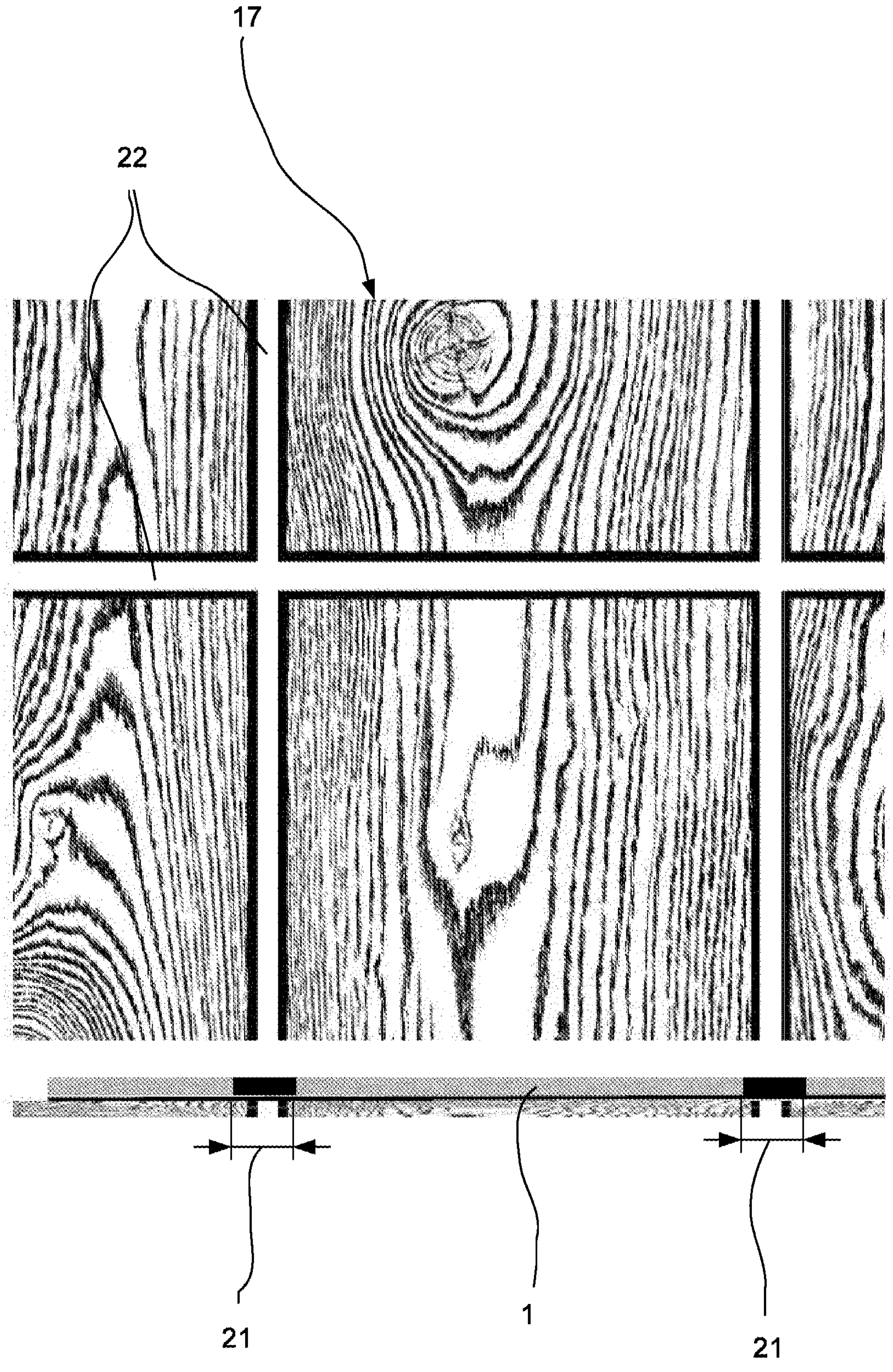
FIG. 3 illustrates a top view of an alternative design of a surface structure of a press blank.

In the illustrated embodiment the press plate 16 includes a press relief 14 that facilitates pressing a surface structure 20 into the press blank 17. The press relief 14 is typically etched into a surface of the associated press plate 16 so that a structured surface is provided. FIGS. 2 and 3 illustrate how a design of a surface structure 20 of a press blank 17 can be configured wherein the configuration of the press relief 14 of an associated press plate 16 has to follow this desired design.

This is caused by the fact that the surface structure 20 is only caused by the configuration of the press relief 14 which is a negative image of the surface structure 20. The press relief 14 of the press plate 16 is pressed into a surface layer of a press blank 17 during the pressing cycle by the heating press 15 so that indentations are fabricated in the surface layer of the press blank 17 wherein the indentations are complementary to the protrusions of the press relief 14. In particular, when replicating naturally grown structures that are intended to imitate surface structures e.g. of wood materials, it is important that the surface structure the respective press blank 17 includes indentations with different configurations. It is particularly important to provide very deep impressions in the respective press blank 17 since these would also be provided in a natural material. A deep impression in the press blank 17 requires a high portion 19 in the press relief 14 of the press plate 16. In a high portion 19, the press relief 14 protrudes rather far beyond a press plate plane of the press plate 16.

Impressing the high portions 19 into the surface layer of a respective press blank 17 requires a rather high pressing force that has to be transferred to the press plate 16. The reaction force that is caused by the surface layer and that impacts the press plate 16 can cause the press plate 16 to slightly deform during the pressing cycle so that the impression of the high portions 19 into the surface layer is not caused in the same manner as in portions of the press relief 14 that have less definition or height. This has the effect that the surface structure 20 of the finished press blank 17 is not configured in the desired manner according to the intended design since the portions of the press blank 17 that shall have rather deep impressions are not configured as intended.

In order to prevent local escapement of the press plate 16 in the high portions 19 of the press relief 14 during the pressing process the press pad 1 is configured according to the invention with functional threads 7. The functional threads 7 are configured in the illustrated embodiment as thickening threads 8 that increase a local thickness 10 of the fabric 2, thus introducing the thickening threads 8 causes the press pad 1 or its fabric 2 to have a thickness 9 in an effective portion 21 of the thickening threads 8 wherein the thickness 9 is increased over a thickness 10 of the fabric 2 outside of an effective portion of the thickening threads 8. Thus, the fabric 2 is less compressible in the respective effective portion 21 of one or plural thickening threads 8 which prevents the local escapement of the press plate 16 towards the heating press 18 in the manner described supra. This has the consequence that a reliable impression of the press plate 16 into the press blank 17 is also provided in portions of the press plate 16 where the structure of the press relief 14 includes corresponding high portions 19.

FIGS. 2 and 3 show in which portions the surface structure 20 of the respective press blank 10 is configured particularly deep and how effective portions 21 for functional threads 7 are provided in the press pad 1 individually adapted to the design. The embodiment according to FIG. 3 relates to a press blank 17 that is provided with a plurality of gaps 22. In this embodiment individual press elements are produced in a single pressing cycles that are separated from each other by gaps 22, In the portions of these gaps 22 the associated press plate 16 includes very pronounced high portions 19 that are configured to impress at least the surface layer of the press blank 17 deep enough so that the finished press blank 17 includes the gaps 22 configured as particularly pronounced indentations. The finished press blank 17 can then be cut apart along the gaps 22 so that individual press elements are produced. The press pad 1 according to the invention that is adapted to a corresponding press plate 16 thus includes functional threads 7 in effective portions 21, in particular thickening threads 8 that are arranged at the press pad 1 at locations that coincide with the high portions 19 of the press plate 16 that in turn create the gaps 22 in the press blank 17. Accordingly the fabric 2 according to the invention a respective press pad 1 is adapted individually to a design of a respective press plate 16 or a desired design of a surface structure of a respective press blank 17 wherein the press plate 16 and the associated press pad 1 jointly form a functional unit where the advantageous effect that is obtained by introducing the functional threads 7 is only obtained in combination with the individually associated press plate 16. Accordingly it is provided according to the invention to individually adapt a respective press pad 1 to a predetermined design of a surface structure 20 of a press blank 17, wherein the adaptation is provided according to the invention by connecting the functional threads 7 with a remainder of the press pad. The press plate 16 and the press pad 1 are advantageously connected with one another in a force transferring manner so that relative movements between both components are prevented at least essentially in a direction of the press plate plane.

Figure 4:
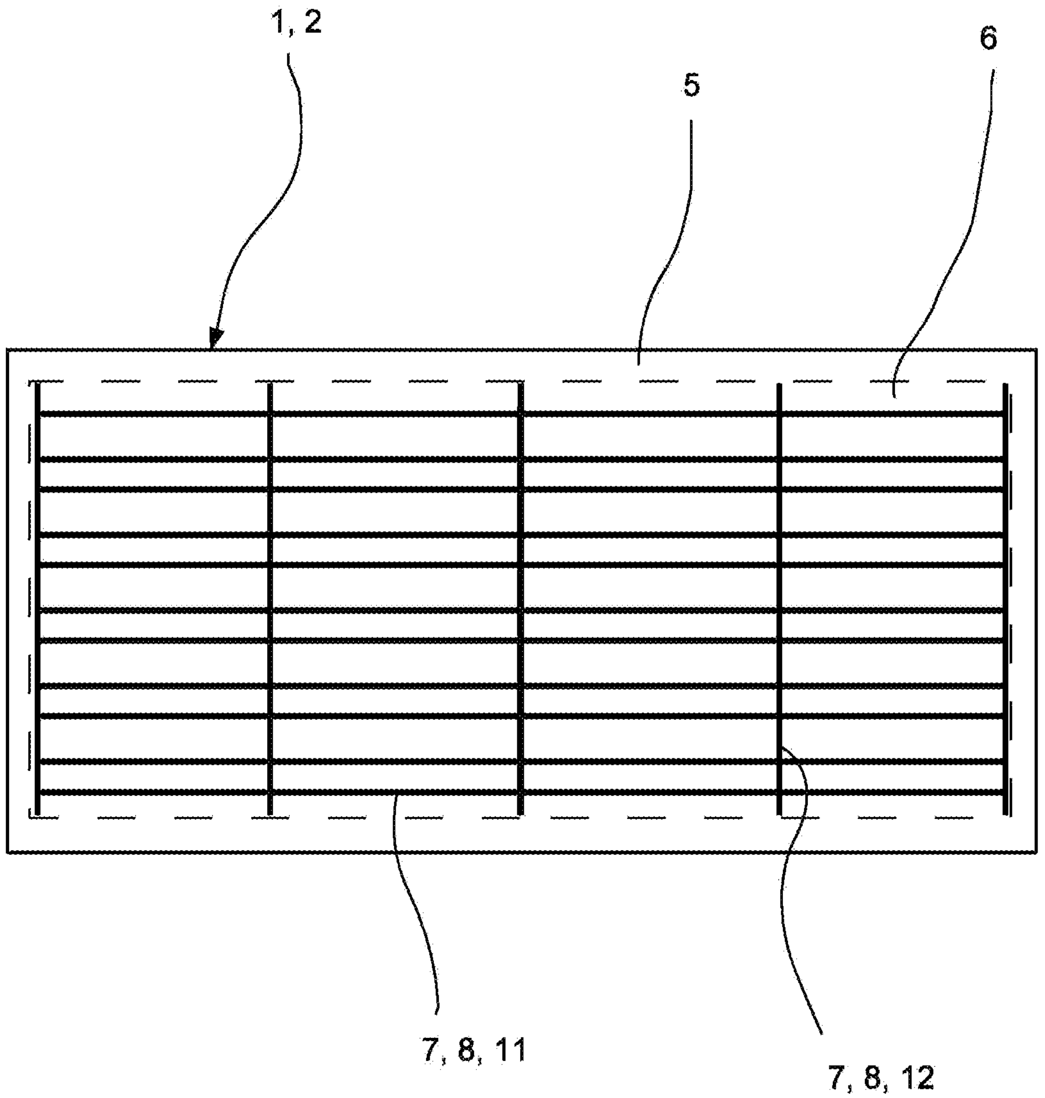
FIG. 4 illustrates a schematic representation of a top view of a press pad according to the invention.
Figure 5:
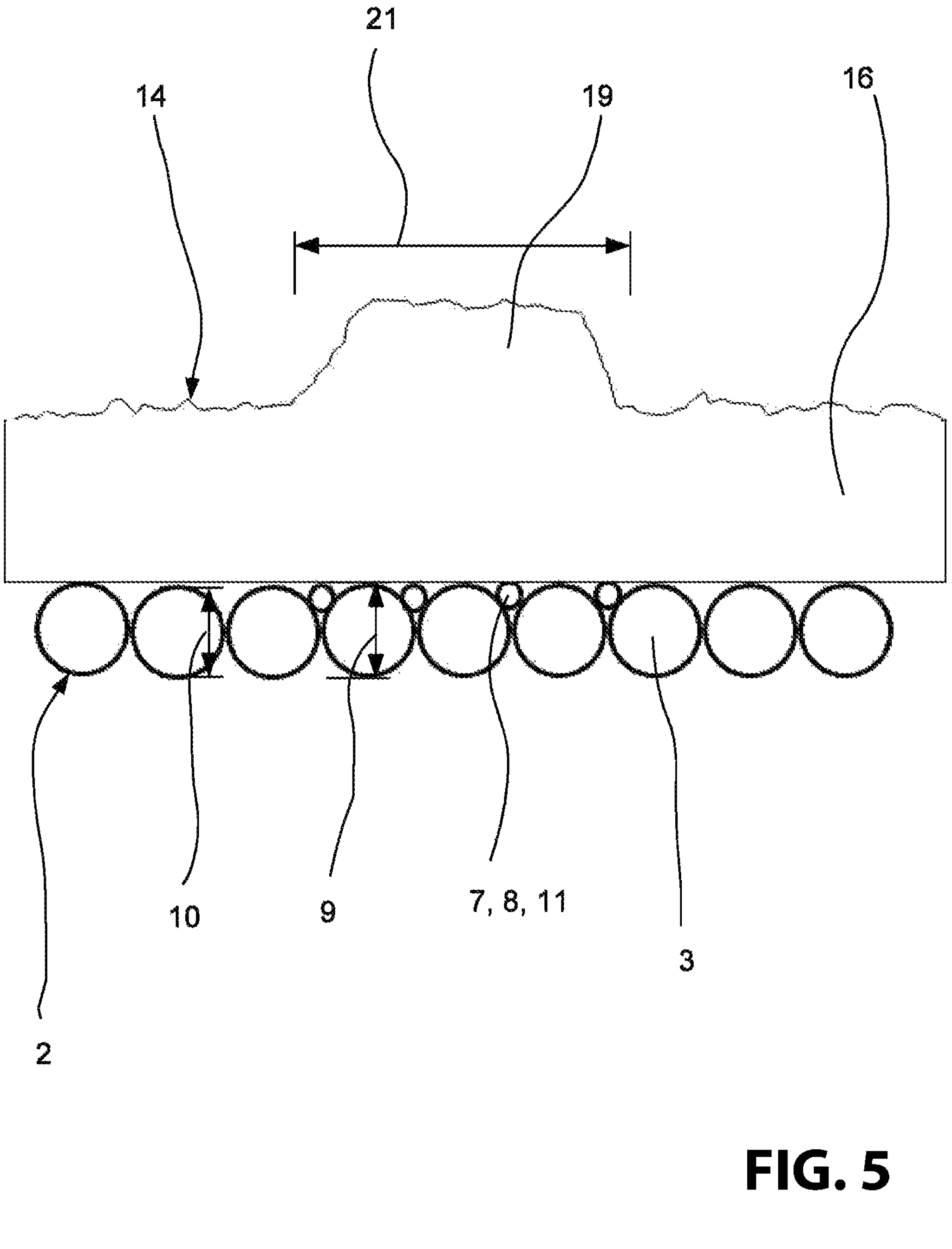
FIG. 5 illustrates a schematic cross-sectional view of a press pad according to the invention overlaying a press relief of an associated press plate.

A fabric 2 according to the invention that is illustrated in FIG. 4 is formed in a known manner by warp threads 3 and weft threads 4 that are connected with one another. In the illustrated embodiment the fabric 2 includes a circumferential edge portion 5 and a center portion 6 that is enveloped by the circumferential edge portion 5. In the illustrated embodiment the fabric 2 includes a plurality of functional threads 7 in a center portion 6 wherein a portion of the functional threads 7 is oriented in the warp direction and the other portion of the functional threads 7 is oriented in the weft direction of the fabric 2. In this embodiment all functional threads 7 are formed by thickening threads 8 that are formed by thickening warp threads 11 in the warp direction and by thickening weft threads 12 in the weft direction. As a matter of principle it is secondary for the invention how the functional threads 7 are connected with the remainder of the fabric 2. By the same token it is particularly advantageous to apply thickening warp threads 11 that extend in the warp direction to the fabric 2 locally, sew them on or weave them on. This achieves the effect that the thickness 9 of the fabric 2 is increased in the effective portion 21 of the thickening warp threads 11 over the thickness 10 of the fabric 2 outside of the effective portion 21, This is illustrated in FIG. 5. The schematic cross section of the fabric 2 is illustrated together with a local detail of an associated press plate 16 with an individual press relief 14 that includes a high portion 19. The thickening warp threads 11 are arranged individually adapted to the press relief 14 so that the effective portion 21 where the thickening warp threads 11 cause the desired increase of the thickness 9 of the fabric 2 coincides with the high portion 19 of the press relief 14. This achieves the effect described supra that the press pad 1 is less compressible in this portion of the press plate 16 where the greatest resistance against the desired impression into the surface layer of the press blank 17 occurs during a pressing cycle so that an escapement of the press plate 16 caused by the reaction force in a direction towards the heating press 18 is counter acted.

Figure 6:
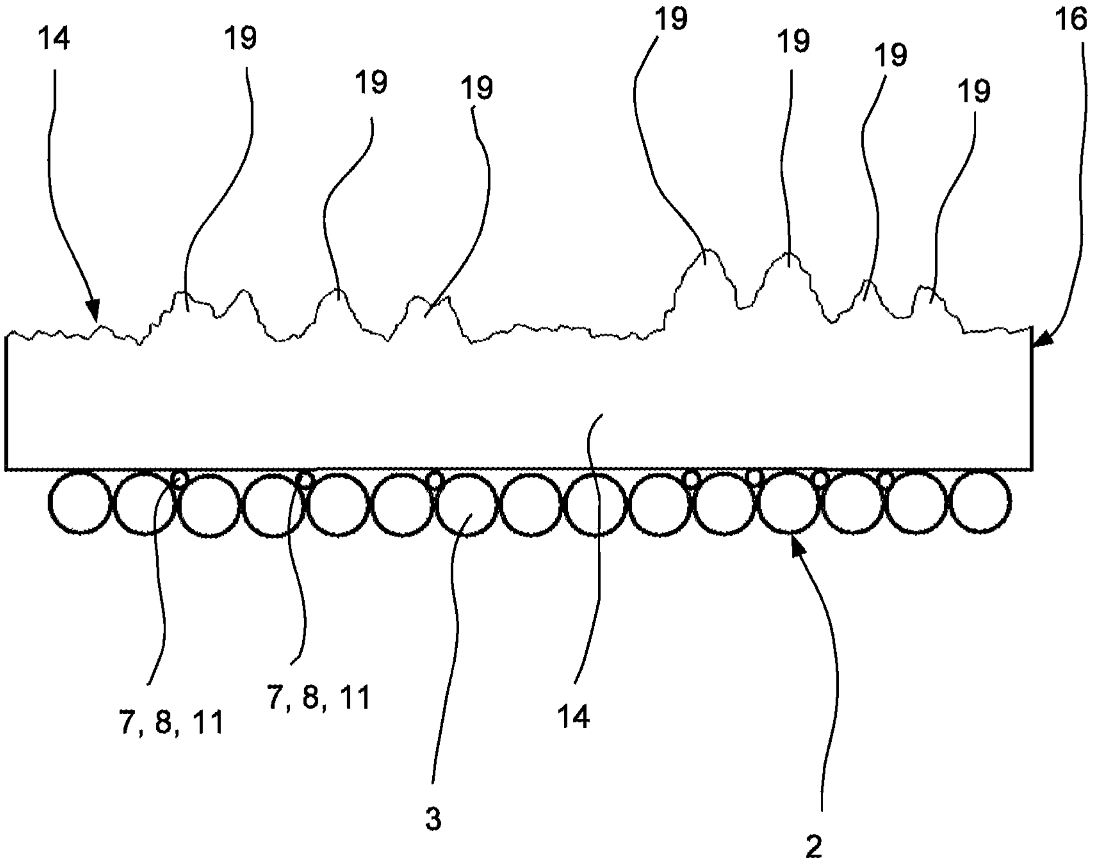
FIG. 6 illustrates an additional cross-sectional view according to FIG. 5.

Another embodiment of a non-uniform introduction of functional threads 7 is illustrated in FIG. 6. Here the functional threads 7 are configured to function as thickening threads in the warp direction of the fabric 2 and thus formed by thickening warp threads 11. The schematic detail of the fabric 2 is selected larger than in the illustration according to FIG. 5 wherein the press relief of the illustrated press plate 16 includes a plurality of high portions 19, The thickening warp threads 11 are positioned in the fabric 2 individually and in a non-uniform arrangement so that their effective portions 21 coincide with the high portions 19 of the press relief 14. This way the intended thickening of the fabric 2 is provided for all high portions 19.

The thickening warp threads 11 are thus formed as additional threads so that a total thread number in the warp direction of the fabric 2 is larger when introducing the functional threads 7 compared to a total number of threads without the functional threads 7. Thickening warp threads 11 are configured by a para aramid in the illustrated embodiment and applied to the remaining fabric 2. Selecting para aramid is advantageous in that para aramid has low heat conductivity along with advantageous mechanical properties so that thermal energy provided by the heating press 18 is transferred less to the press plate 16 and thus to the press blank 17 in effective portions 21 of the thickening warp threads 11 than in portions of the fabric 2 that does not include the thickening warp threads 11, This reduced heat conductivity of the press pad 1 in the effective portions 21 of the thickening warp threads 11 causes the surface layer of the press blank 17 that is typically made from melamine resin to cure more slowly so that it remains formable over a longer time period. This means it has a comparatively low viscosity. The increase of viscosity that occurs during curing of the surface layers of the press blank 17 is consequently slowed down in the effective portions 21 of the thickening warp threads 11. The deep portions of the surface structure 20 of the press blank 17 can thus be formed during a longer operating time.

Figure 7:
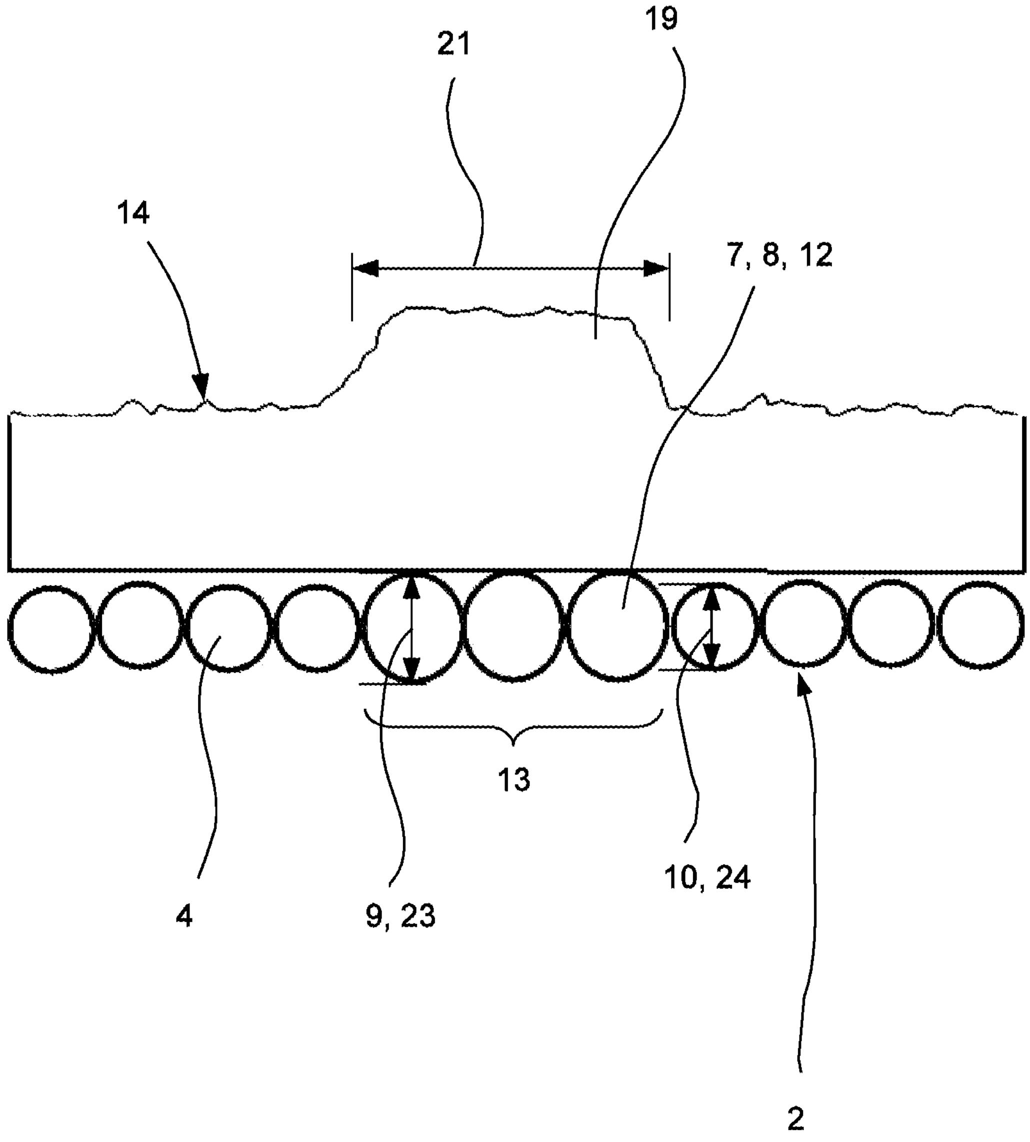
FIG. 7 illustrates another cross-sectional view according to FIG. 5.

Last not least, FIG. 7 illustrates a schematic cross section of the fabric 2 that shows the weft threads 4 of the fabric 2. The fabric 2 includes functions threads 7 in the weft direction that are formed by thickening threads 8. Since these thickening threads run in the weft direction the thickening threads 8 are formed by thickening weft threads 12. Differently from the warp direction described supra the thickening weft threads 12 are not applied to the fabric 2 in the illustrated embodiment, thus not sown on or woven on but woven directly into the fabric 2 at weave in locations 13. In particular at locations where the fabric 2 includes the thickening weft threads 12 the normal weft threads 4 are not provided at these locations. This has the effect that a total thread counts of the fabric 2 is not changed by introducing the thickening weft threads 12, The diameter 23 of the thickening weft threads 12 is increased in the illustrated embodiment over the diameter 24 of the remaining weft threads 4, so that the thickness 9 of the fabric 2 in the effective portion of the thickening weft threads 12 is increased over the thickness 10 outside of the effective portion 21. The technical effect of this configuration is identical to the technical effect that is achieved by the thickening described supra that is achieved by the thickening warp threads 11. The diameter 23 of the thickening weft threads 12 is 1.65 mm in the illustrated embodiment whereas the diameter 24 of the remaining weft threads 4 in the illustrated embodiments is 1.5 mm. The thickening weft threads 12 are formed by silicone and thus their material corresponds to the material of the remaining weft threads 4.

REFERENCE NUMERALS AND DESIGNATIONS

1 Press pad
2 Fabric
3 Warp thread
4 Weft thread
5 Edge portion
6 Center portion
7 Functional thread
8 Thickening thread
9 Thickness
10 Thickness
11 Thickening warp thread
12 Thickening weft thread
13 Weave in location
14 Press relief
15 Heating press arrangement
16 Press plate
17 Press blank
18 Heating press
19 High portion
20 Surface structure
21 Effective portion
22 Gap
23 Diameter
24 Diameter

What is claimed is:

1. A press set for a hydraulic heating press arrangement, the press set comprising:

a press plate including a press relief;

a press pad associated with the press plate and including a fabric, wherein the fabric is formed by warp threads in a warp direction and weft threads in a weft direction, wherein the warp threads and the weft threads are woven together to form the fabric, wherein functional threads run, in the warp direction or in the weft direction and are connected with the fabric so that a thickness of the fabric in an effective portion of the functional threads differs from a thickness of the fabric outside of the effective portion of the functional threads, and wherein the thickness of the fabric in the effective portion is adapted to the press relief of the press plate.

2. The press set according to claim 1, wherein at least a portion of the functional threads is formed by thickening threads so that the thickness of the fabric in the effective portion of the functional threads is increased relative to the thickness of the fabric outside of the effective portion of the functional threads.

3. The press set according to claim 1, wherein at least a portion of the functional threads is sewn or woven onto the fabric or sewn or woven into the fabric.

4. The press set according to claim 1, wherein a majority of the warp threads is formed by metal or brass.

5. The press set according to claim 1, wherein a majority of the functional threads that are arranged in the warp direction has a diameter between 0.1 mm and 0.3 mm.

6. The press set according to claim 1, wherein a majority of the weft threads is formed by an electromeric material or silicone, and wherein a diameter of a respective weft thread is between 1.5 mm and 1.6 mm.

7. The press set, pad, according to claim 1, wherein a majority of functional threads in the warp direction of the fabric is formed by thickening warp threads that are sewn or woven onto the fabric in the warp direction.

8. The press set according to claim 1,
wherein a majority of the functional threads is formed by thickening weft threads in the weft direction of the fabric,
wherein the thickening weft threads are woven into the fabric, and
wherein a diameter of the thickening weft threads is greater than a diameter of the weft threads.

9. The press set according to claim 8, wherein the thickening weft threads are woven into the fabric so that the weft threads are omitted at weave in locations of the thickening weft threads so that a total thread count of all the weft threads and the thickening weft threads remains constant.

10. The press set according to claim 1, wherein at least a portion of the functional threads or thickening warp threads that run in the warp direction are made from an aramid or a para aramid.

11. The press set according to claim 1,
wherein at least a portion of the functional threads, or the thickening weft threads that run in the weft direction are made from silicone, and
wherein a diameter of a respective functional thread is at least 1.70 mm.

12. The press set according to claim 1, wherein the functional threads are arranged in a non-uniform distribution.

13. A method for producing a press pad for a hydraulic heating press arrangement, the method comprising:
predetermining a design of a press plate that is configured to impress a press blank in the hydraulic heating press arrangement wherein the press plate includes a press relief that includes a structure, so that a surface structure is producible in the press blank that corresponds to the press relief by impressing the press plate into a surface layer of the press blank;
producing the press pad adapted to dimensions of the press plate, wherein warp threads and weft threads are woven into a fabric of the press pad,
wherein the press pad is produced as a function of a predetermined design of the press plate so that a thickness of the fabric is adapted at least in portions of the press pad that correspond to high portions of the press relief, wherein functional threads are connected with the fabric so that the thickness of the fabric in effective portions of the functional threads differs from the thickness of the fabric outside of the effective portions of the functional threads, and the thickness of the fabric in the effective portions is adapted to the press relief of the press plate.

14. The method according to claim 13, wherein the press pad and the press plate are connected in a force transferring manner so that relative movements between the effective portions of the functional threads of the press pad and corresponding portions of the press relief are at are substantially prevented or entirely prevented.

15. The press set according to claim 1,
wherein, the effective portion is a thickened effective portion that is thickened compared to areas of the press pad outside the thickened effective portion, and
wherein the thickened effective portion is separate from a marginal zone of the press pad adjacent to edges of the press pad so that the press pad is thicker in areas distal from the edges of the press pad compared a thickness at the edges of the press pad.

16. The method according to claim 13, wherein the effective portions are thickened effective portions that are thickened compared to areas of the press pad outside the thickened effective portions, and
wherein the thickened effective portions are separate from a marginal zone of the press pad adjacent to edges of the press pad so that the press pad is thicker in areas distal from the edges of the press pad compared a thickness at the edges of the press pad.

* * * * *